(12) United States Patent
Lee

(10) Patent No.: US 7,032,504 B2
(45) Date of Patent: Apr. 25, 2006

(54) FILTERING DEVICE FOR ESPRESSO MAKER

(76) Inventor: Pao Chen Lee, No.2, Lane 112, Nan Hsing Rd., Yung Kang City, Tainan Hsien (TW)

( * ) Notice: Subject to any disclaimer, the term of this patent is extended or adjusted under 35 U.S.C. 154(b) by 62 days.

(21) Appl. No.: 10/942,644

(22) Filed: Sep. 16, 2004

(65) Prior Publication Data

US 2006/0054030 A1    Mar. 16, 2006

(51) Int. Cl.
*A47J 31/00*    (2006.01)
*A47J 31/06*    (2006.01)
*A23F 3/00*    (2006.01)
*A23L 1/00*    (2006.01)

(52) U.S. Cl. ............................ 99/287; 99/295; 99/297; 99/302 R; 99/303

(58) Field of Classification Search ................ 699/495, 699/509, 275, 284, 286, 287, 288–290, 295–303, 699/307, 313, 315, 323, 323.1; 210/473, 210/474, 477, 479, 481, 482, 455; 426/433, 426/241, 243

See application file for complete search history.

(56) References Cited

U.S. PATENT DOCUMENTS

| | | | | |
|---|---|---|---|---|
| 5,150,645 A | * | 9/1992 | Schiettecatte | 99/295 |
| 6,012,379 A | * | 1/2000 | Matuschek | 99/323 |
| 6,035,762 A | * | 3/2000 | Ruckstuhl | 99/295 |
| 6,109,168 A | * | 8/2000 | Illy et al. | 99/285 |
| 6,192,786 B1 | * | 2/2001 | Gasser et al. | 99/319 |
| 6,220,147 B1 | * | 4/2001 | Priley | 99/323 |
| 6,431,055 B1 | * | 8/2002 | Bonanno | 99/302 P |
| 6,513,419 B1 | * | 2/2003 | Huber et al. | 99/315 |
| 6,561,080 B1 | * | 5/2003 | Feeney | 99/319 |
| 6,840,158 B1 | * | 1/2005 | Cai | 99/323.1 |
| 6,857,355 B1 | * | 2/2005 | Rolland | 99/302 R |
| 2003/0172813 A1 | * | 9/2003 | Schifferle | 99/275 |
| 2004/0000237 A1 | * | 1/2004 | Wu | 99/283 |

* cited by examiner

*Primary Examiner*—Timothy Simone
(74) *Attorney, Agent, or Firm*—Charles E. Baxley

(57) ABSTRACT

A filtering device for an espresso maker includes a coffee powder basket and a filtering mechanism. The coffee powder basket includes a coffee powder receiving section for receiving coffee powders and a compartment below the coffee powder receiving section. The compartment includes an outlet for guiding coffee out of the coffee powder basket. The filtering mechanism includes a filtering plate and a swirl-creating device for creating swirl. Coffee passing through meshes of the filtering plate flows through the swirl-creating device and forms swirl to provide an atomized diffusion effect, allowing the coffee to encompass air and thus form coffee foams.

5 Claims, 9 Drawing Sheets

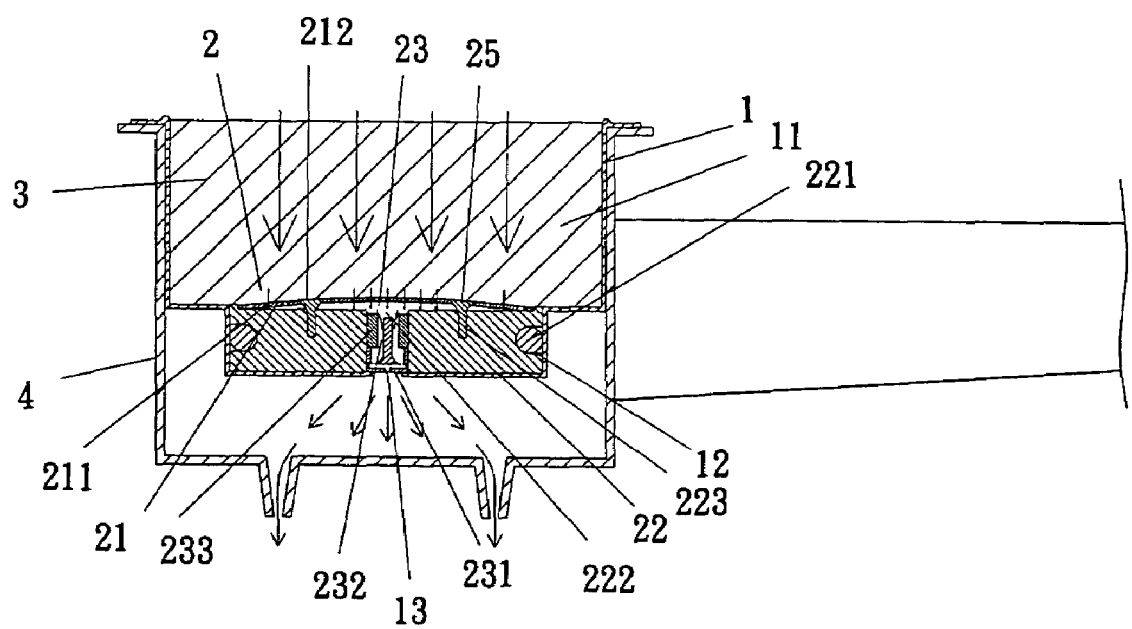
F I G . 3

FILTERING DEVICE FOR ESPRESSO MAKER

BACKGROUND OF THE INVENTION

1. Field of the Invention

The present invention relates to a filtering device for an espresso maker. In particular, the present invention relates to a filtering device for an espresso maker for providing improved flavor.

2. Description of the Related Art

A conventional espresso maker uses a high-pressure pump to force water into a heater at a pressure of 10 kg/cm². The water is heated by the heater to about 94° C. The hot water enters a coffee powder basket 1' (FIG. 6) that receives coffee powder 2' (FIG. 7). The coffee powder basket 1' includes dozens of meshes 11' of a diameter smaller than 0.5 mm to provide a filtering function. The high-pressure and high-temperature water passing through the coffee powder basket 1' dissolves the substances contained in the coffee powder, such as caffeine and coffee berry oil. Flavored espresso is obtained by adding a layer of coffee cream (or creamy layer) floating on the level of the coffee. The creamy layer is formed by means of mixing the coffee berry oil with air under high-speed turbulent. However, the holes 11' are too large and thus cause a pressure drop, failing to obtain the speed and turbulence required for the coffee berry oil to encompass air for forming coffee foams.

FIG. 8 shows another conventional coffee powder basket 3' and FIG. 9 shows operation of the coffee powder basket 3' receiving coffee powders 2'. The coffee powder basket 3' includes a plurality of meshes 31' of a diameter smaller than 0.5 mm to provide a filtering function. Further, a hole 32' of a diameter smaller than 0.5 mm is provided below the meshes 31'. By this arrangement, the internal pressure of the coffee powder basket 3' can be kept at about 10 kg/cm². The high-pressure and high-temperature water that dissolves the substances contained in the coffee powders exits the coffee powder basket 1' via the hole 32', providing more coffee foams. However, since the coffee is directly guided out of the coffee powder basket 3' by the hole 32' (FIG. 9), the space allowing mixing of the coffee and the air is limited. As a result, the coffee foam-forming effect is still unsatisfactory.

SUMMARY OF THE INVENTION

In accordance with a first aspect of the present invention, a filtering device for an espresso maker comprises a coffee powder basket and a filtering mechanism. The coffee powder basket includes a coffee powder receiving section for receiving coffee powders and a compartment below the coffee powder receiving section. The compartment includes an outlet for guiding coffee out of the coffee powder basket. The filtering mechanism includes a filtering plate and a swirl-creating means. The filtering plate is mounted above the compartment and includes a plurality of meshes for guiding filtered coffee from the coffee powder receiving section into the compartment. The swirl-creating means is mounted in the compartment and located below the filtering plate.

The swirl-creating means includes a swirl-creating seat and a column. The swirl-creating seat includes a central chamber. The swirl-creating seat further includes an aperture in a central area of a bottom thereof. The aperture is aligned with the outlet of the coffee powder basket. A plurality of guiding channels are formed on an inner face of the bottom of the swirl-creating seat and extending radially outward from the aperture. The column includes a lower end located in the central chamber of the swirl-creating seat and above the aperture.

Coffee passing through the meshes of the filtering plate flows through the swirl-creating seat and forms swirl to provide an atomized diffusion effect, allowing the coffee to encompass air and thus form coffee foams.

A connecting seat is mounted in the compartment for securely fixing the swirl-creating means. A waterproof ring is mounted around a periphery of the connecting seat. The connecting seat further includes a through-hole aligned with the outlet.

The swirl-creating means further comprises a guiding sleeve mounted on top of the swirl-creating seat. The guiding sleeve includes a longitudinal bore. The column includes an upper section extending into the longitudinal bore of the guiding sleeve.

The connecting seat includes at least one engaging hole and the filtering plate includes at least one engaging hole. An engaging member is extended through the engaging hole of the connecting seat and the engaging hole of the filtering plate, thereby securely fixing the filtering plate above the connecting seat.

Other objectives, advantages, and novel features of the invention will become more apparent from the following detailed description when taken in conjunction with the accompanying drawings.

BRIEF DESCRIPTION OF THE DRAWINGS

FIG. 3 is a sectional view illustrating operation of the filtering device in accordance with the present invention.

DETAILED DESCRIPTION OF THE PREFERRED EMBODIMENT

Figure 1:
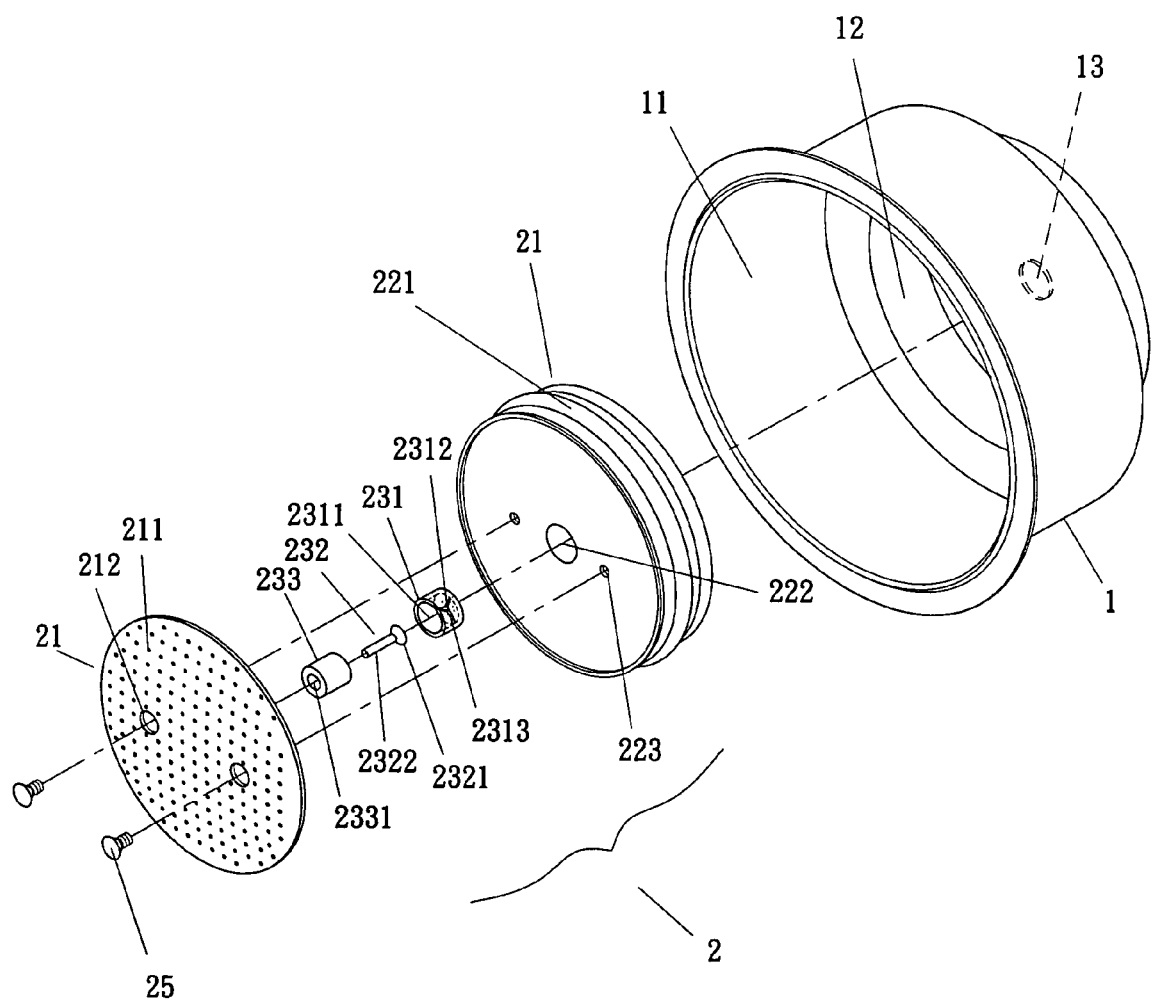
FIG. 1 is an exploded perspective view of a filtering device for an espresso maker in accordance with the present invention.
Figure 2:
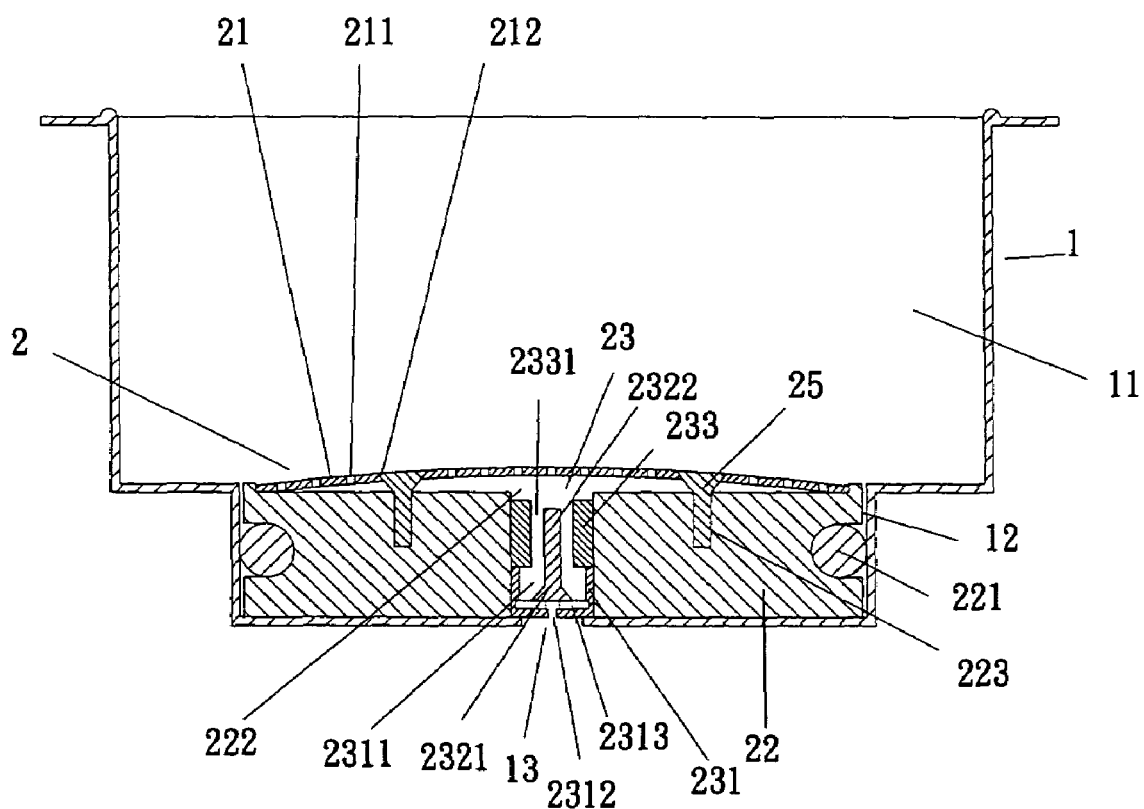
FIG. 2 is a sectional view of an espresso maker equipped with the filtering device in accordance with the present invention.

Referring to FIGS. 1 and 2, a filtering device for an espresso maker in accordance with the present invention comprises a coffee powder basket 1 and a filtering mechanism 2. The coffee powder basket 1 includes a coffee powder receiving section 11 for receiving coffee powders 3 (FIG. 3) and a compartment 12 for receiving the filtering mechanism 2. The compartment 12 includes an outlet 13 for guiding coffee out of the filtering device.

The filtering mechanism 2 comprises a filtering plate 21, a connecting seat 22, and a swirl-creating means 23. The filtering plate 21 is made of metal and includes a plurality of meshes 211 through which coffee passes. The filtering plate 21 includes at least one engaging hole 212. The connecting seat 22 is mounted in the compartment 12 and includes a waterproof ring 221 mounted around a periphery of the connecting seat 22. The connecting seat 22 further includes a through-hole 222 aligned with the outlet 13. Further, the connecting seat 22 includes at least one engaging hole 223, and at least one engaging member 25 is extended through the engaging holes 212 and 223 to secure the filtering plate 21 above the connecting seat 22.

Figure 4:
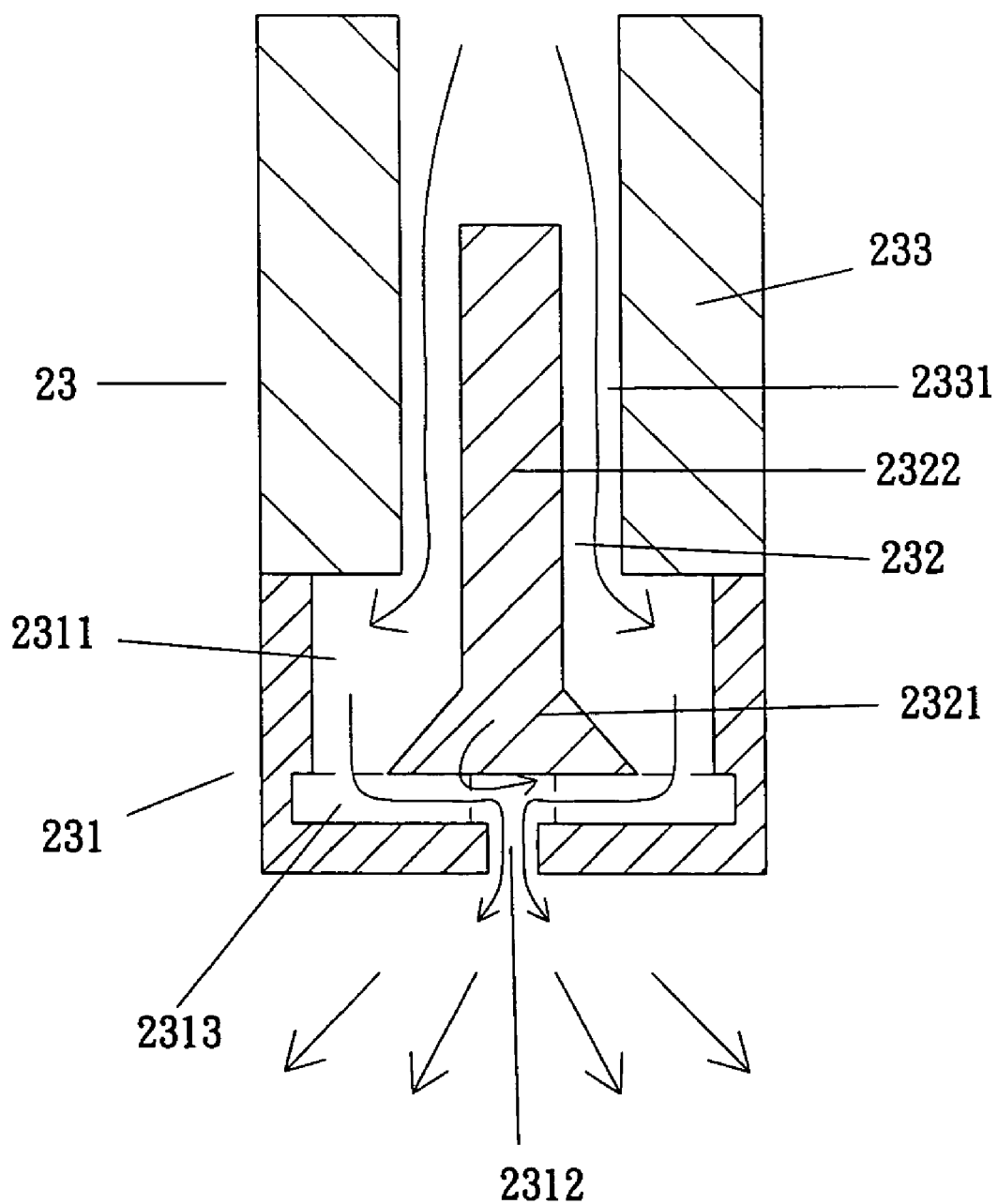
FIG. 4 is an enlarged sectional view illustrating operation of a swirl-creating means of the filtering device.
Figure 5:
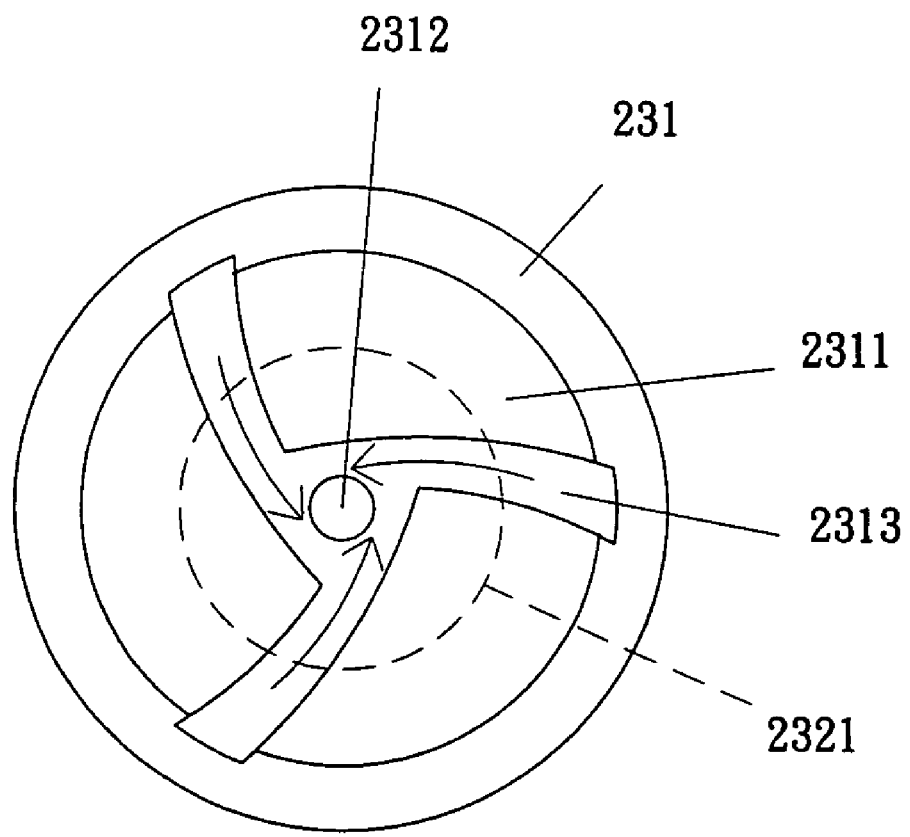
FIG. 5 is a top view illustrating operation of the swirl-creating means of the filtering device.
Figure 6:
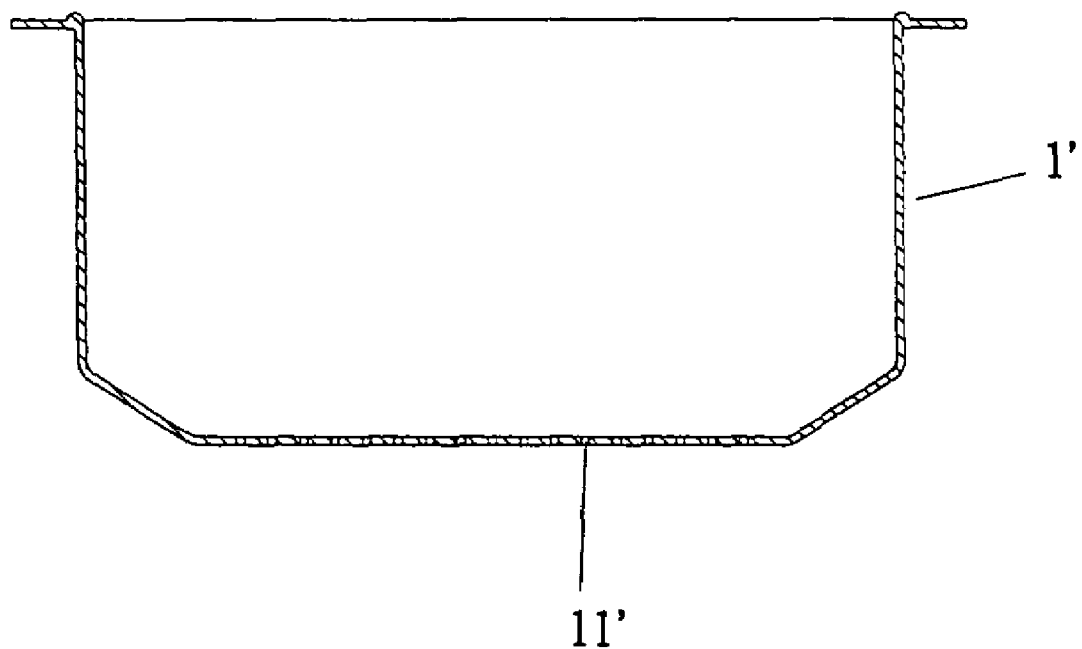
FIG. 6 is a sectional view of a conventional coffee powder basket.
Figure 7:
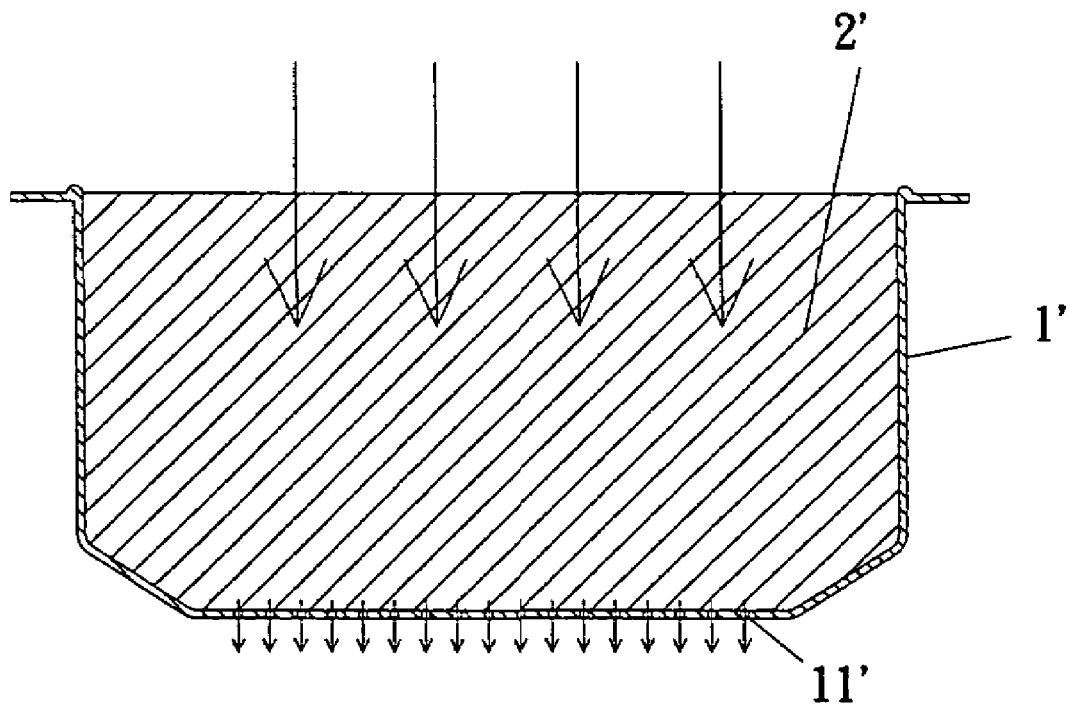
FIG. 7 is a sectional view illustrating operation of the conventional coffee powder basket.
Figure 8:
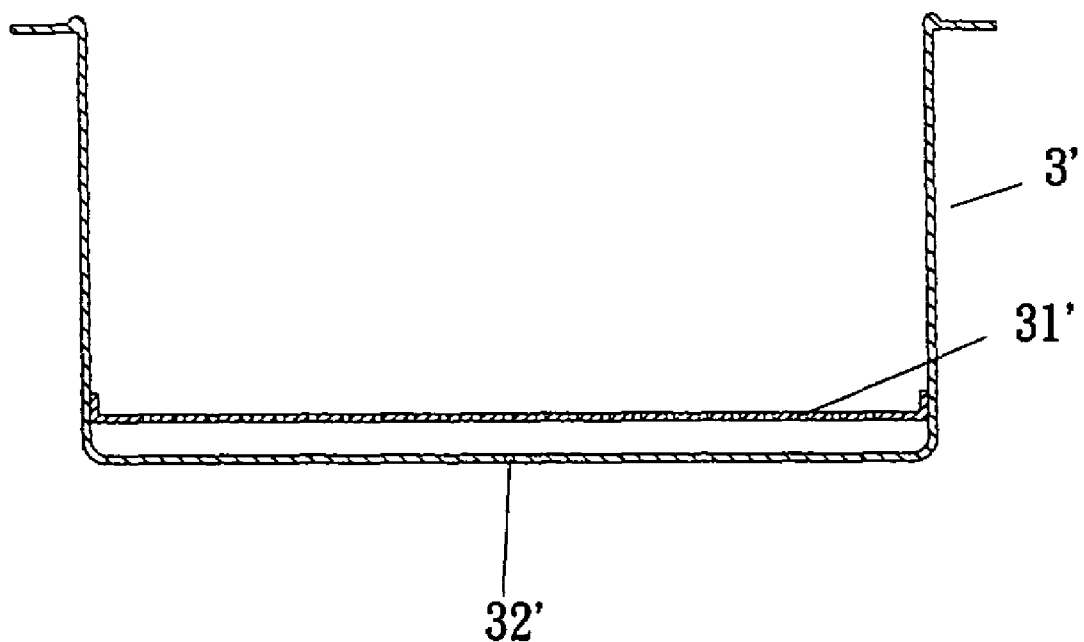
FIG. 8 is a sectional view of another conventional coffee powder basket.
Figure 9:
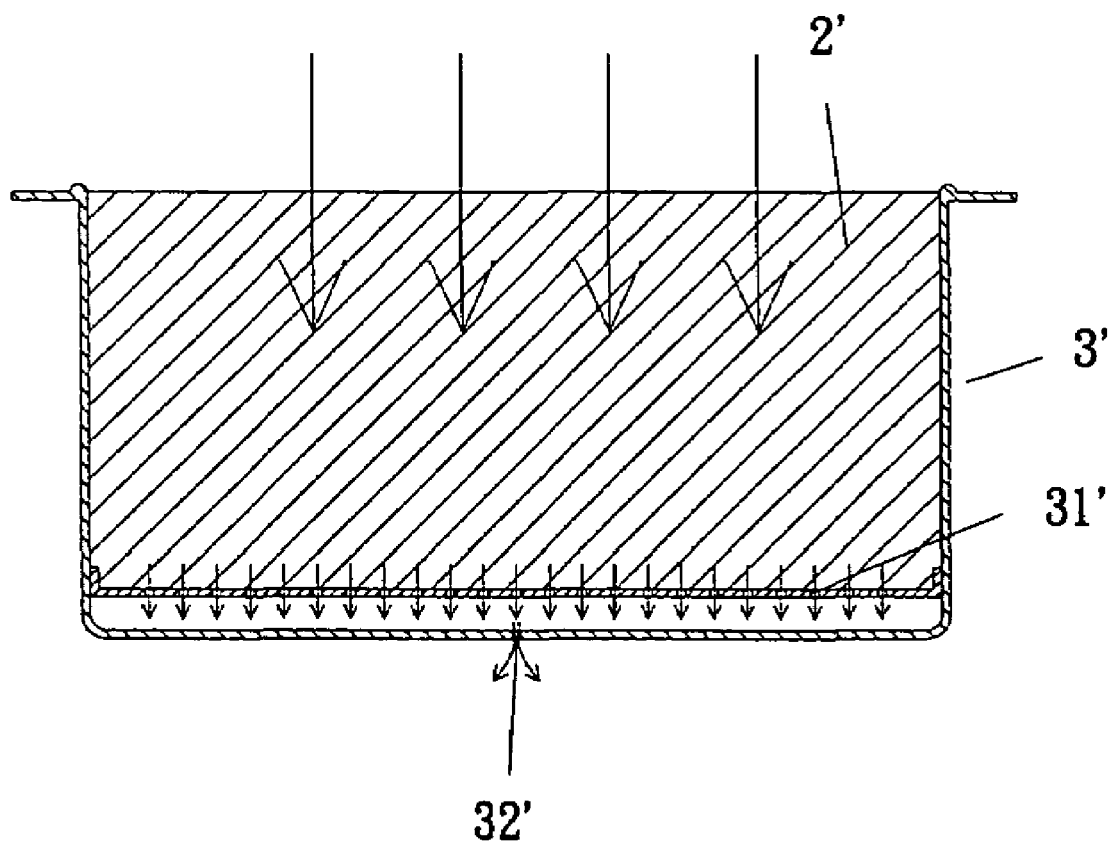
FIG. 9 is a sectional view illustrating operation of the conventional coffee powder basket.

The swirl-creating means 23 includes a swirl-creating seat 231, a column 232, and a guiding sleeve 233. The swirl-creating seat 231 is hollow and mounted in the through-hole 222. More specifically, as illustrated in FIGS. 4 and 5, the swirl-creating seat 231 includes a central chamber 2311 and an aperture 2312 in a central area of a bottom thereof. Formed on an inner face of the bottom of the swirl-creating seat 231 are a plurality of guiding channels 2313 extending radially outward from the aperture 2312. Each guiding channel 2313 is preferably slightly curved. The column 232 includes a lower end 2321 that is located above and shields the aperture 2312 and that is spaced from the aperture 2312. In this embodiment, the lower end 2321 of the column 232 is in the form of a truncated cone. The guiding sleeve 232 is mounted on top of the swirl-creating seat 231 and includes a longitudinal bore 2331 into which an upper section 2322 of the column 232 extends.

Referring to FIG. 3, coffee powders 3 are placed into the receiving section 11 of the coffee powder basket 1, which is then placed into a container 4 of an espresso maker (not labeled) in a sealed condition. The high-pressure and high-temperature water from the espresso maker is guided into the coffee powder basket 1 to dissolve the substances contained in the coffee powders. Then, the coffee flows through the meshes 211 of the filtering plate 21 into the swirl-creating means 23. Since the coffee powder basket 1 includes only one aperture 2312 for guiding coffee, a relatively high pressure can be stably kept in the coffee powder basket 1.

The filtered coffee enters the central chamber 2311 of the swirl-creating seat 231 via the longitudinal bore 2331. Then, the stream of filtered coffee impinges the lower end 2321 of the column 232 and guided by a peripheral wall delimiting the central chamber 2311 into the guiding channels 2313. Next, the filtered coffee passing through the guiding channels 2313 exits the 2312 in the form of swirl. An atomized diffusion effect is obtained, and the coffee berry oil in the coffee effectively encompasses air and forms coffee foams to improve the flavor. The espresso thus obtained exits the filtering device via the outlet 13 and then exits the container 4 of the espresso maker for drinking, best shown in FIG. 3.

Although a specific embodiment has been illustrated and described, numerous modifications and variations are still possible without departing from the essence of the invention. The scope of the invention is limited by the accompanying claims.

What is claimed is:

1. A filtering device for an espresso maker, the filtering device comprising:
    a coffee powder basket (1) comprising a coffee powder receiving section (11) for receiving coffee powders and a compartment (12) below the coffee powder receiving section, the compartment (12) including an outlet (13) for guiding coffee out of the coffee powder basket; and
    a filtering mechanism (2) comprising a filtering plate (21) and a swirl-creating means (23), the filtering plate being mounted above the compartment and including a plurality of meshes (211) for guiding filtered coffee from the coffee powder receiving section into the compartment, the swirl-creating means being mounted in the compartment and located below the filtering plate;
    the swirl-creating means (23) including a swirl-creating seat (231) and a column (232), the swirl-creating seat including a central chamber (2311), the swirl-creating seat further including an aperture (2312) in a central area of a bottom thereof, the aperture (2312) being aligned with the outlet (13) of the coffee powder basket (1), a plurality of guiding channels (2313) being formed on an inner face of the bottom of the swirl-creating seat (231) and extending radially outward from the aperture (2312), the column (232) including a lower end (2321) located in the central chamber (2311) of the swirl-creating seat (231) and above the aperture (2312);
    wherein coffee passing through the meshes of the filtering plate flows through the swirl-creating seat and forms swirl to provide an atomized diffusion effect, allowing the coffee to encompass air and thus form coffee foams.

2. The filtering device for an espresso maker as claimed in claim 1 further comprising a connecting seat (22) mounted in the compartment (12) for securely fixing the swirl-creating means, further including a waterproof ring (221) mounted around a periphery of the connecting seat, the connecting seat further including a through-hole (222) aligned with the outlet (13).

3. The filtering device for an espresso maker as claimed in claim 1 wherein the swirl-creating means (23) further comprises a guiding sleeve (233) mounted on top of the swirl-creating seat (231), the guiding sleeve including a longitudinal bore (2331), the column (232) including an upper section (2322) extending into the longitudinal bore (2331) of the guiding sleeve.

4. The filtering device for an espresso maker as claimed in claim 2 wherein the swirl-creating means (23) further comprises a guiding sleeve (233) mounted on top of the swirl-creating seat (231), the guiding sleeve including a longitudinal bore (2331), the column (232) including an upper section (2322) extending into the longitudinal bore (2331) of the guiding sleeve.

5. The filtering device for an espresso maker as claimed in claim 2 wherein the connecting seat (22) including at least one engaging hole (223), the filtering plate (21) including at least one engaging hole (212), further including at least one engaging member (25) being extended through said at least one engaging hole of the connecting seat and said at least one engaging hole of the filtering plate, thereby securely fixing the filtering plate above the connecting seat.

* * * * *